Figure 6:
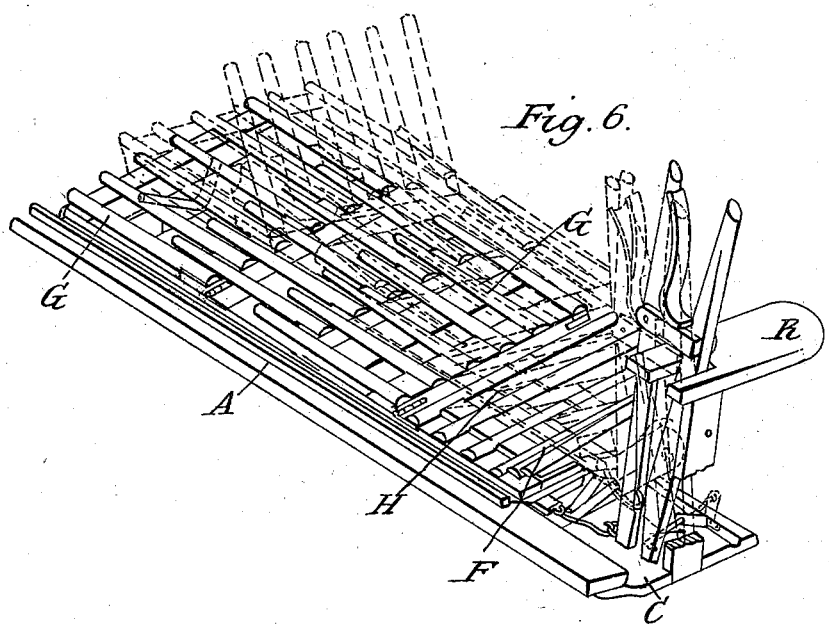

J. S. FOWLER.
Discharging Apparatus for Harvesters.
No. 79,967.
2 Sheets—Sheet 1.
Patented July 14, 1868.
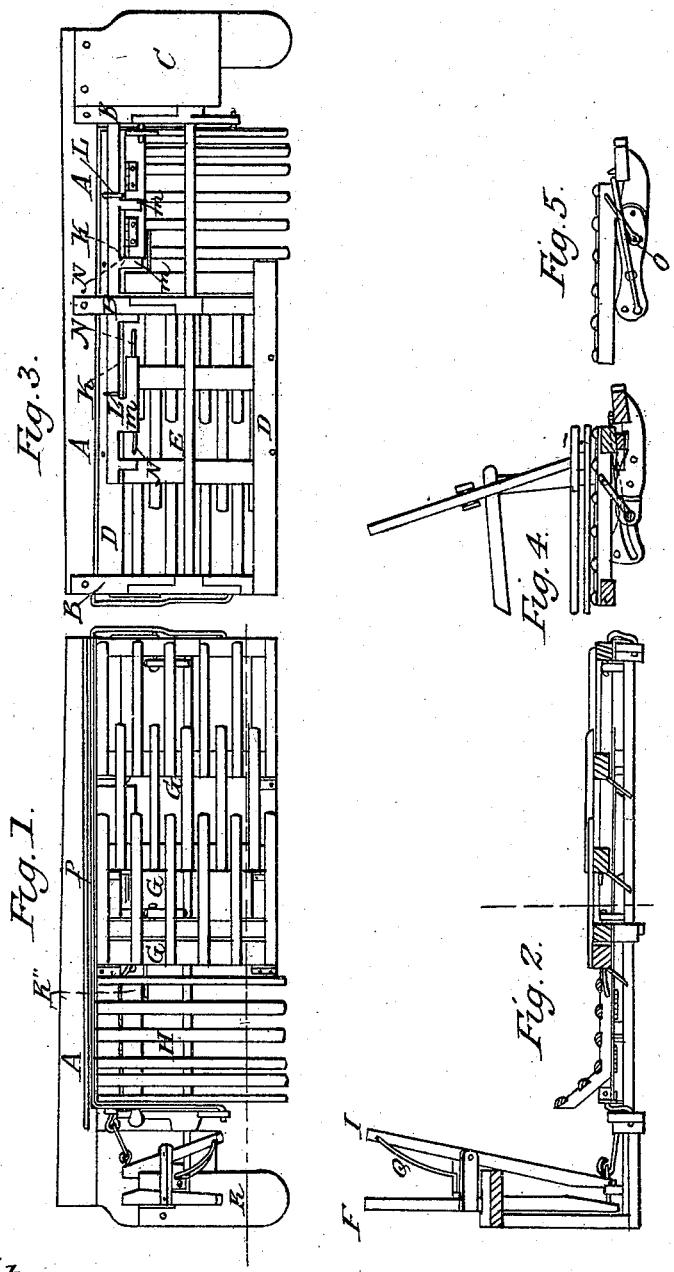

J. S. FOWLER.
Discharging Apparatus for Harvesters.

No. 79,967.  2 Sheets—Sheet 2.

Patented July 14, 1868.

UNITED STATES PATENT OFFICE.

JAMES S. FOWLER, OF DAVENPORT, IOWA.

IMPROVEMENT IN DISCHARGING APPARATUS FOR HARVESTERS.

Specification forming part of Letters Patent No. 79,967, dated July 14, 1868.

*To all whom it may concern:*

Be it known that I, JAMES S. FOWLER, of the city of Davenport, in the county of Scott and State of Iowa, have invented a new and useful Improvement in Reaping-Machines; and I do declare that the following is a clear, full, and exact description of the construction and operation of the same, reference being had to the annexed drawings, making a part of this specification, in which—

Figure 1 is a top view of the device. Fig. 2 is a longitudinal section of the same. Fig. 3 is an under-side view. Fig. 4 is a transverse section of the lever end, and Fig. 5 is a transverse section of the opposite end.

My device consists of a finger-bar, A A, (see Fig. 3,) screwed on its under surface to three projecting arms, B B B, and to the floor of the operator's seat C. Said arms are in two pieces, pivoted at the outer ends, as represented on Fig. 5 of drawings.

The letters D D represent a movable platform, resting on the projecting arms of the finger-bar, and connected to the same by a rod, E, passing through holes in the three projecting arms, and connecting with lever F. (See Fig. 2.) On the top of the platform D are attached, by hinge-joints, two or more slatted gates, G G G, (see Fig. 1;) also, one slatted rack, H, at right angles with the slatted gates. Said rack is hinged to the front bar, and held up, when the slatted gates G G are down, by a projecting pin, R″, on the gate G nearest the rack. When the slatted gates are raised for the purpose of throwing the grain upon the rack H, the projecting pin R″ is removed from the under side of rack H, and the weight of the gavel of grain upon said rack causes it to fall, and the grain slides off upon the stubble.

The slatted gates G G and the rack H are connected with lever I (see Fig. 2) by means of a sliding bar constructed in the form shown by letter K, (see Fig. 3,) and moving back and forth in staples L L, attached to the frame of the platform. This bar is connected with and moved by lever I.

I construct this sliding bar with teeth M M M, which teeth work against arms N N N, that project from the slatted gates, and all move at the will of the operator. I adjust these teeth, respectively, at such distances from each other that the outermost gate shall be first raised, then the second, &c.

I adjust the platform to the desired height by means of the set-screw and slot shown by letter O on Fig. 5.

Letter P represents a dividing-rod or cut-off, as seen in Fig. 1, which is raised to its proper height at the same time and by the same means that the movable platform is thrown back.

Letter Q represents a steel spring, working in connection with lever I, which spring assists in the reverse action of said lever.

Letter R is the seat for the operator.

I will now proceed to describe the operation of the machine. As the grain is cut by the reaper it falls upon the slatted gates until sufficient is deposited for a convenient-sized gavel, when the operator, by means of the lever F, moves the platform D back from the finger-bar, and at the same time the dividing-rod or cut-off P is raised to a sufficient height to prevent the grain which is being cut from falling upon the slatted gates until that already deposited is rolled into a gavel by the action of the rod E, acting through the sliding bar K upon the slatted gates G G, and thrown upon the rack H, and from thence to the stubble, thereby delivering the grain out of the way of the reaper as it passes again on its round. The operator then, by a reverse action of lever F, returns the platform to the finger-bar, and at the same time the dividing-rod resumes its former position, and the cut grain falls upon the slatted gates again, ready to be conveyed to the stubble, as above described.

What I claim as my invention, and desire to secure by Letters Patent, is—

1. The slatted gates G G G, constructed and operating substantially as and for the purposes set forth.

2. In combination with the slatted gates G G G, the rack H, sliding bar K, and levers F and I, constructed and operating substantially as specified.

JAMES S. FOWLER.

Witnesses:
S. F. SMITH,
W. J. BIRCHARD.